United States Patent [19]

Evans et al.

[11] 4,414,237
[45] Nov. 8, 1983

[54] PROCESS FOR PREPARING A SAUCE CONTAINING BREAD CRUMBS AND PRODUCT THEREOF

[75] Inventors: David N. Evans, Dover; Gary W. Jarvis, Hartly; Wayne L. Steensen, Newark; Manoj Kumar O. Shah, Dover, all of Del.

[73] Assignee: General Foods Corporation, White Plains, N.Y.

[21] Appl. No.: 419,878

[22] Filed: Sep. 20, 1982

Related U.S. Application Data

[63] Continuation of Ser. No. 220,565, Dec. 29, 1980, abandoned.

[51] Int. Cl.³ .............................................. A23L 1/22
[52] U.S. Cl. ...................................... 426/589; 426/19; 426/397; 426/638
[58] Field of Search .............. 426/244, 555, 552, 589, 426/652, 653, 573, 590, 302, 293, 19, 638, 397, 650

[56] References Cited

U.S. PATENT DOCUMENTS 4,068,009  1/1978  Rispoli .............................. 426/291

OTHER PUBLICATIONS

Lord, *Everybody's Cookbook*, Harcourt, Brace & Co., N.Y., 1937, pp. 539–540.

*Primary Examiner*—Raymond N. Jones
*Assistant Examiner*—Elizabeth A. Hatcher
*Attorney, Agent, or Firm*—Walter Scott; Thomas R. Savoie; Daniel J. Donovan

[57] ABSTRACT

The objects of the invention are the provision of an improved food product of the type having a smooth, continuous aqueous phase with discrete pulp-simulating particles dispersed therein and to an improved process for preparing products of this type which could withstand the processing conditions of heat and shear.

According to the present invention, products of this type are improved by employing as the pulp-simulating particles from about 1 to 10%, based upon the weight of the products, of bread crumbs consisting essentially of wheat flour, yeast and salt, the bread crumbs having a porous, striated and elongated shape and structure and a particle size wherein they are retained on a USS 60 mesh screen after passing a USS 16 mesh screen. These bread crumbs readily absorb moisture from the aqueous phase to provide soft yet coherent pulp-like particles which enhance the appeal of food products, such as barbeque sauces and simulated fruit sauces.

8 Claims, No Drawings

PROCESS FOR PREPARING A SAUCE CONTAINING BREAD CRUMBS AND PRODUCT THEREOF

This is a continuation of application Ser. No. 220,565, filed Dec. 29, 1980 now abandoned.

BACKGROUND OF THE INVENTION

1. Technical Field

The present invention relates to food products of the type having a smooth, continuous aqueous phase with discrete pulp-simulating particles dispersed therein. More particularly, the present invention is directed to products of this type which are improved by virtue of the type of material employed to simulate the pulp and the process for preparing the product.

Much of the enjoyment obtained from food involves textural characteristics and appearance. While taste is often said to be the most important factor for food products, careful analysis will show that slight modifications in the textural qualities of a food product will greatly affect the outcome of "taste" tests. Many products are enhanced both visually and in the mouth by the presence of discrete, smooth, soft, coherent, pulp-like particles dispersed throughout.

Often, the intense mixing and severe heating required to prepare a commercial product will dissipate the natural food pulp particles which would otherwise remain in an animal or vegetable-based aqueous food. The natural pulp particles can be defined as those moist, at least slightly-cohering masses dispersed throughout the aqueous food product which consists essentially of soft undissolved animal or vegetable particles or pieces, such as the soft, fibrous piece of fruit or vegetable or the somewhat fibrous proteinaceous particles formed in a cooked meat gravy.

The challenge to the food industry has been to arrive at a pulp-simulating material which can be added to food products where natural visual and mouthfeel characteristics of pulp would enhance the appeal and enjoyment of the food product, yet which would be capable of withstanding commercial processing conditions. The art has developed a number of processes for adding natural or simulated pulp to food products; however, a low-cost alternative which can withstand commercial processing (heat and shear) would be desireable.

2. Background Art

In U.S. Pat. No. 3,443,964 to Marotta et al, it is disclosed that earlier prior art attempts to simulate pulp in starch-containing food products by dispersing cracker particles therein were unsuccessful. Marotta et al indicate that the cracker particles failed to impart either a good grain or pulpy appearance to the resulting food product. They indicate in addition, that the presence of the cracker meal detracted from the natural color of the food product. Marotta et al also disclosed that tapioca pearls have been employed to impart a textural contrast to baby foods. They indicate, however, that the extreme clarity and fragility of the pearls severely hampered the formation of a desirable pulpy texture within the product.

To correct these prior deficiencies, Marotta et al disclose that a gelatinized, amylose-containing starch product which had been cross-linked to a specific degree, gelatinized in the shape of a thin film and then pulverized to discrete particles of a suitable size distribution, produced a desirable grainy, pulpy texture in food products. To achieve the desired resistance to disintegration during subsequent processing operations, however, it was necessary to employ a starch which was inhibited by reaction with a polyfunctional cross-linking agent.

In another similar disclosure, Trubiano et al disclose in U.S. Pat. No. 3,579,341 that cross-linked starches outside the range disclosed by Marotta et al can also be employed when properly granulated and otherwise processed. What Trubiano et al describe as their discovery is the determination that highly cross-linked starches, not disclosed as workable in the disclosure of Marotta et al, could be successfully employed where the starch was precooked and dried such as by drum drying.

In another related disclosure, Marotta et al describe in U.S. Pat. No. 3,650,770 that a non-cross-linked cold water swelling, amylose-containing starch can be employed to prepare a pulp simulating additive. However, U.S. Pat. No. 3,443,964 to Marotta et al indicates that cross-linking within the limits set forth is necessary to obtain products whose pulpy texture exhibits maximum resistance to disintegration during various subsequent processing operations.

U.S. Pat. No. 3,676,148 to De Weese et al suggests the use of crumbs, such as cracker crumbs, corn bread crumbs, white bread crumbs, or the like, in combination with gelatin to solidify a normally liquid sauce while cold. This enables cold storage of the sauce between bread slices or the like without causing them to become soggy, yet permits a desirable consistency in the heated sauce. The various crumbs employed here are of conventional formulation and are not selected for their ability to withstand heat or shear. There is no disclosure of the desirability of imparting a pulpy character to the sauces mentioned by the use of pulp simulating additives.

Another approach to simulating pulp in food products has been to add natural food pulp. For example, in U.S. Pat. No. 4,160,849 to Huchette et al, natural potato pulp is added to various food products. However, while the pulp is natural in the sense that it is unmodified as removed from its source, it is an artificial additive in the same sense as the starch-based pulp simulations when added to foods other than the source material, and will encounter difficulties in withstanding heat and shear conditions.

SUMMARY

The principal objects of the invention are to provide an improved food product of the type having a smooth, continuous aqueous phase with discrete pulp-simulating particles dispersed therein, and to provide an improved process for preparing such food products.

These objects and others are achieved according to the present invention which provides an improved food product of the type having a smooth, continuous aqueous phase with discrete pulp-simulating particles dispersed therein, wherein the improvement comprises: employing as the pulp-simulating particles from about 1 to about 10%, based on the weight of the food product, of bread crumbs consisting essentially of wheat flour, yeast and salt; said bread crumbs having a porous, striated and elongated shape and structure and particle size wherein the particles are retained on a USS 50 mesh screen after passing through a USS 16 mesh screen. The improved process provided by the invention enables the preparation of a food product of the type described wherein the improvement comprises employing, as the pulp-simulating particles, bread crumbs of the type described above.

DETAILED DESCRIPTION OF THE INVENTION

The invention provides food products in a wide variety of formulations and consistencies which have a smooth, continuous aqueous phase with discrete pulp-simulating particles dispersed therein. The pulp-simulating particles are prepared in a manner which gives them a smooth, soft feel in the mouth and a pleasing pulpy appearance to the eye. The pulp-simulating particles are stable texturally for long periods of storage and through intense commercial processing conditions, especially in terms of resistance to heating and mixing under high shear conditions.

The present invention has its widest applicability to fluid food products which will typically be described as liquid. Thus, products which would normally flow under their own weight when placed on the horizontal surface, for example beverages, sauces and gravies, such as barbeque sauce, ketchup, apple sauce, spaghetti sauce, salad dressing, meat gravy, cocktail sauce, chili sauce, tomato juice, etc. can be distinctly improved according to the present invention by incorporating therein bread crumbs of the critical type and particle size of this invention. While these food products can be bottled and stored for future use, they can also be frozen and stored. As well, this invention is applicable to dry mixes for preparing fluid food products, such as identified above.

The invention also has applicability to spreadable products which, while not defined as liquid because they will not flow under their own weight on a horizontal surface, are sufficiently plastic to be easily spreadable with a knife or penetrable by a spoon. Among the products which fall within this class are dips, spreads and puddings.

All of the products prepared according to the present invention will contain a smooth, continuous aqueous phase within which are dispersed the pulp-simulating bread crumbs. The smooth continuous aqueous phase will typically be flavored, colored and thickened. The aqueous phase can be a wholly-natural sauce such as a sauce condensed from whole tomatoes, or it can be wholly-simulated or a partly extended natural product. The aqueous continuous phase can contain additional material dispersed therein besides the pulp-simulating material. For example, a vegetable or animal fat can be emulsified therein to provide a smoother mouthfeel, or other particulates such as nuts, chopped onion, chopped peppers, or the like can be added for their desired flavor, visual appeal or textural effect.

The discovery of the present invention that the particular type of bread crumbs described herein will remain stable to high-temperature and high-shear commercial food processing, while coventionally-prepared bread crumbs will not, enables the introduction of a nutritious pulp-simulating material at a very low cost. The bread crumbs prepared according to the present invention are prepared from a dough that consists essentially of wheat flour, yeast, and salt. Minor amounts of other materials can be present so long as they do not affect the structural or textural stability of the bread crumbs when employed in aqueous food products. For example, minor amounts of materials such as fat, sugar, flavor (spices) and color can be added to the bread crumb formulation without adversely affecting the structure or stability of the bread crumbs. Under certain circumstances it is desirable to employ other bread dough additives in low amounts for their known purposes. For example, preservatives or anti-microbials such as calcium propionate, sodium benzoate, potassium sorbate, BHA, BHT, etc can be employed in amounts effective for their specific purpose.

The unique characteristics of the bread crumbs disclosed herein are believed to be in part due to their formulation, and also in part due to their structure. U.S. Pat. No. 4,068,009 is hereby incorporated by reference for the description of the shape, structure and formulation of the bread crumbs of this invention. The bread crumbs are porous with an elongated and striated shape and structure. A preferred process for preparing the bread crumbs of this critical structure is a straight dough process wherein there is no fermentation stage after mixing the ingredients. According to the preferred procedure for preparing bread crumbs, the ingredients are blended into a smooth dough; the dough is then covered, proofed, molded into units, covered and proofed again, and baked in a dielectric oven to form the bread; the bread is then cooled and staled for from 18 to 30 hours. After properly staling the bread, it is then shredded such as in a hammermill using a 0.20 to 0.625" screen opening with knife edges forward and operating at an RPM within the range of from about 1800 to about 6000 RPM. The resulting bread crumbs are then dried and screened to the desirable particle size distribution.

The formulation for the bread dough will consist essentially of wheat flour, yeast, and salt in addition to the water required for suitable processing, and may contain a restricted amount of materials such as oil (fat) and sugar. Preferably, the dough formulation will comprise the following ingredients: from about 50 to about 65% wheat flour, from about 30 to 45% water, from about 0.5 to 1.5% yeast, from 0.25 to 1.5% salt, from 0 to about 2% fat, from 0 to about 2% sugar, and an effective amount of an anti-microbial. A typical conventional bread crumb formulation would comprise substantially higher amounts of sugar, shortening and milk solids which would affect the structural or textural stability of the bread crumbs when employed in aqueous food products. Further, conventional bread crumbs typically have a randomly oriented, porous and spherical shape and structure.

The bread from which the bread crumbs are made can also be prepared by other methods. However, when processing the bread and bread crumbs, care should be taken to use means whereby the bread crumbs of the specific shape, structure and particle size are obtained.

To effectively provide a pulpy texture in an aqueous food product, the bread crumbs should be of a particle size wherein they pass through a 16 mesh screen but are retained on a 60 mesh screen (U.S. Standard). Bread crumbs which pass through a 60 mesh screen can be added to the food product, but should not be counted in the effective amount of bread crumbs as they do not appreciably contribute to the desired pulpy texture. The following table lists the preferred maximum percentages of particles within any particular size range:

| Mesh Size (USS Screen) | Preferred maximum weight in fraction (Weight %) |
| --- | --- |
| Through 16 -on 30 | 30 |
| Through 30 -on 50 | 100 |
| Through 16 -on 50 | 100 |

According to the preferred embodiments of the invention, the ingredients of the food product, including the bread crumbs are admixed and then heated with agitation to fully cook all the ingredients and yield the final desired texture. For example, the food product can be subjected to heat conditions of greater than 180° F. (80° C.) and shear conditions during mixing of at least 200 rpm. Ordinary bread crumbs under conditions of heat and shear or under storage conditions would generally break down and solubilize. In contrast, the bread crumbs of this invention are remarkably stable against heat, shear and storage conditions. There are embodiments, however, wherein the food product as a whole does not require a separate heating step and can be simply admixed.

The choice of these specific ingredients for the food product will depend upon the desired texture and the end use for the product. Typically, however, the products will contain a starch thickener, a saccharide sweetener, water, spices, flavors and colors, and a suitable acidulent. Suitable food starches include raw, pregelatinized as well as modified starch and can be derived from sources such as wheat, corn, tapioca and potato.

Among the suitable saccharide sweeteners are those mono- and disaccharides typically employed for their sweetening ability. Principal among these are sucrose, dextrose, glucose, corn syrup solids, corn syrup, high fructose corn syrup, and invert sugar. The saccharide sweetener is important not only for its sweetening ability, but for its addition of solids to the food product which helps provide the smooth consistency of the continuous aqueous phase.

The spices, flavors, and colors can be selected as desired for the various end uses contemplated for the food product. Among the typical spices and flavors are paprica, onion powder, garlic powder, mace, black pepper, white pepper, thyme, bay, ginger, oregano, monosodium glutamate, hydrolized vegetable protein, salt, natural and synthetic food flavors, natural and synthetic meat flavors, and just about any other flavor desired. The color can be supplied by natural and synthetic food colorings.

To stabilize the pulpy texture and appearance in the aqueous food material a starch complexer, such as sodium stearoyl-2-lactylate, monoglycerides, sodium stearoyl fumerate, glycerol monostearate, polyglycerol esters of fatty acids, or propylene glycol mono and diesters of fats and fatty acids can be added. These complexers may be added to the food material to increase stabilization of the bread crumbs of this invention during processing (heat and shear) as well as over storage. Generally these starch complexers are employed at levels up to 3% by weight of the bread crumbs of this invention.

Many food products require a slightly tangy taste which can be imparted by the use of a suitable acidulent. Any of those food acceptable acidulents known to the art can be employed in amounts effective to provide the desired degree of tangy taste. Among these acidulents are citric acid, acetic acid, vinegar, adipic acid, malic acid, fumaric acid, and the like. Typically, citric acid will be employed where a fruity flavor is desired and acetic acid in its purified form or as vinegar will be employed where its characteristic tangy taste is more preferred.

BEST MODE FOR CARRYING OUT THE INVENTION

While the number of food products which can be prepared according to the present invention is virtually unlimited, the following more detailed description will focus on the preparation of barbeque-flavored sauce which is suitable for applying as a coating to meat which is cooked by convection or radiant heat, and to an apple flavored sauce which simulates the flavor and texture of apple sauce. The description of these materials is for the sake of conciseness in description and applicants do not wish to be limited thereto.

In the exemplary case of a barbeque sauce, a highly delicious food sauce can be prepared wherein the continuous aqueous phase is given a tangy, spicy flavor which is complimented by the presence of discrete pulp-simulating particles according to the present invention which enhance the full bodied mouthfeel. The sauce is colored a deep reddish brown by the use of food coloring, and this coloration is picked by the bread crumbs which are present in an amount of from about 1 to 10%, preferably in an amount of from about 1.5 to about 5.0%.

Preferably, the barbeque sauce will be prepared from about 35 to 50% water, from about 25 to 40% sugar (e.g. corn syrup), from about 10 to about 20% vinegar (e.g. 120 grain), up to about 10% spices, flavorings and colors, from about 1 to 5% of the bread crumbs prepared in accordance with this invention, up to 5% of a starch (e.g. a modified food starch), and up to about 1% of a starch complexer such as sodium stearoyl-2-lactylate.

The ingredients are preferably blended together, cooked at a temperature of from about 200° F. to 240° F. (93° to 116° C.) in a scraped surface heat exchanger wherein they are held for a period of time effective to cook the sauce, and suspend bread crumbs and blend the ingredients uniformly throughout the resulting continuous aqueous phase. The bread crumbs remains cohesive throughout the agitation and the heating step. After the cooking, the resulting sauce is cooled to a temperature of from about 135° to about 150° F. (55° to 65° C.), deaerated by subjecting to a partial vacuum within a range of from about 22 to 30 inches of mercury (0.76 to 1.04 Kg per cm$^2$), and bottled. The stability of the bread crumbs to this processing and after extended periods of storage in the package is exceptionally good. For example, after storage of six months at 95° F. (35° C.) the bread crumbs were found to be stable in that they imparted a desireable pulpy texture.

Sauces, such as apple sauce and the like, can also be effectively simulated according to the present invention. An uncooked simulated apple sauce can be prepared by employing, for example, from about 55 to 65% water, from about 20 to about 30% high fructose corn syrup, from about 3 to about 10% bread crumbs according to the invention, from about 2 to about 5% pregelatinized modified starch, from about 1 to about 2% nonfat dry milk solids, coloring, apple flavoring and an acidulent. To prepare this uncooked formulation, these ingredients are simply admixed, to achieve the necessary homogenity and hydration of the ingredients, especially the starch and the bread crumbs. This sauce will have much the same consistency as commercial apple sauces.

It is within the contemplation of the present invention to provide sauce mixes which can be packaged dry for preparation by the consumer upon addition of water, either with or without a required cooking step. Similarly, the dry mix could be packaged as a spice and thickening preparation which could be mixed, for example, with tomato juice to form a rich, thick, pulpy barbeque sauce or for admixture with apple juice to provide a thick desirable pulpy apple sauce.

The following examples are presented to further illustrate and explain the present invention and are not to be taken as limiting in any regard. Unless otherwise specified, all parts and percentages are by weight, based upon the total weight of a composition at the particular stage in processing indicated.

EXAMPLE 1

This example describes one preferred technique for preparing the bread crumbs suitable for use according to the present invention and employs these bread crumbs in a barbeque sauce. The bread crumbs are prepared from the following ingredients:

| Ingredient | Weight % |
| --- | --- |
| Bromated Wheat Flour | 57.9 |
| Sucrose (granulated) | 0.9 |
| Vegetable Shortening with TBHQ | 0.9 |
| Salt | 0.7 |
| Yeast (compressed) | 0.7 |
| Calcium Propionate | 0.1 |
| Water | 38.8 |

The yeast is dissolved in five times of its weight of lukewarm water and is allowed to stand while the remaining dry ingredients are blended. The yeast solution and the remaining water are then added to the dry blend and are mixed for about 10 minutes to develop a smooth dough. This is a straight dough process and no time is taken for fermentation. The dough is then covered to prevent formation of crust and is maintained at a temperature controlled to within the range of 90° to 100° F. (30° to 40° C.) and about 85% relative humidity for one half hour of proofing during which the dough rises. After this intermediate proof, the dough is punched down and divided into units weighing about 3 lbs (1.4 Kg) each. Four of these molded loaves are placed in a plastic pan which is 4 inches deep, 14 inches wide, and 15 inches long. The total weight of the dough within the pan is 12 lbs (5.4 Kg). This heavy loaf limits the degree of expansion during the proof and baking process. The pan is again covered and proofed in a steamer. After proofing for 30-40 minutes, the pan is placed in a dielectric oven wherein it is baked for about 12 to 15 minutes to an internal loaf temperature of about 200° F. (93° C.). After completion of the baking, the loaves are staled for about 18-30 hours at ambient temperature. The staled loaves are then crushed and shredded in shredding machine. After crushing and shredding the resulting particles are dried in a convection oven at a temperature of about 325° F. (160° C.) for from about 2 to 3 minutes to reduce the moisture content of the particles to about 3 to 5%.

The resulting bread crumbs are then sized to that substantially all of the crumbs pass through a USS 16 mesh screen and are retained on a USS 60 mesh screen. About 27% by weight of these bread crumb particles pass through a USS 16 mesh screen and are retained on a USS 30 mesh screen.

The resulting bread crumbs and the other ingredients listed in the following table are then admixed in the amounts indicated below to prepare a barebecue sauce:

| Ingredients | Weight % |
| --- | --- |
| Water | 42.9 |
| Corn Syrup | 32.3 |
| Vinegar | 13.5 |
| Spices, Flavorings, Colors | 6.3 |
| Bread Crumbs | 3.7 |
| Modified Food Starch | 0.8 |
| Sodium Stearoyl-2-lactylate | 0.5 |

The resulting admixture is then passed to a Votator scraped surface heat exchanger at a flow rate of about 2 gallons (7.6 liters) per minute to cook the admixture to a temperature of about 220° F. (105° C.) with a hold time within the heat exchanger of about 30 seconds. After exiting the heat exchanger, the resulting sauce is cooled to a temperature of 150° F. (65° C.) and deaerated by subjecting it to a partial vacuum of about 23 inches of mercury (7.9 Kg per cm$^2$). The resulting product had a thick, continuous, smooth, aqueous phase having pulpy, appealing particulates suspended uniformly throughout.

EXAMPLE 2

This example presents a comparison between the product prepared according to the Example 1 and two control products prepared in identical manner except they substitute, on a one-to-one basis, bread crumbs prepared in conventional manner. One control sample employs bread crumbs from a recipe designed to provide a fluffy loaf of bread whereas the other control sample is prepared from a recipe designed to provide a pasty load of bread. The formulations of these two controls are set forth below:

|  | Fluffy Loaf (%) | Pasty Loaf (%) |
| --- | --- | --- |
| Wheat Flour | 57.5 | 54.6 |
| Sugar | 3.9 | 3.7 |
| Salt | 1.2 | 1.1 |
| Veg. Shortening | 1.6 | 1.5 |
| Milk Substitute | 0.8 | 0.8 |
| Yeast | 0.9 | 1.0 |
| Calcium Propionate | 0.2 | 0.2 |
| Water | 33.9 | 37.1 |

The procedures for preparing the bread crumbs differ significantly in a number of regards as are outlined in the following table:

|  | Example 1 | Fluffy | Pasty |
| --- | --- | --- | --- |
| Mixing Time | 11-12 Min. (straight dough mixing) | 10 Min. Medium | 8 Min. Medium |

-continued

| | Example 1 | Fluffy | Pasty |
|---|---|---|---|
| Fermentation Time | None | 90 Min. | 30 Min. |
| Scale Weight | 1.4 Kg | 1.1 Kg | 1.1 Kg |
| Type of Pan | Plastic | Metal | Metal |
| Dough wt/pan | 5.4 Kg | .7-1.2 Kg | .7-1.2 Kg |
| Shape of dough | Loaf | Sheet | Loaf |
| Pan size | 4" × 15" × 14" (102 × 381 × 356 mm) | ¾" high pan (19 mm) | 10½" × 5 × 3" (267 × 127 × 76 mm) |
| Proof | Yes | Yes | No |
| Baking | Dielectric Oven | Gas Oven | Gas Oven |
| Dicing action | Crushing and shredding | Slicing and cutting | Slicing and cutting |
| Drying Temp. | 160° C. | 80-150° C. | 80-95° C. |
| Drying Time | 2-3 Min. | 6-12 Min. | 6-12 Min. |
| Shape and Structure | Elongated, Porous and Striated | Randomly Oriented, Porous and Spherical | Randomly Oriented, Porous and Spherical |
| Particle Size | Through 16 mesh on 60 mesh | Through 16 mesh on 60 mesh | Through 16 mesh on 60 mesh |

The following finished product evaluation demonstrates that the product prepared in accordance with Example 1 cannot be duplicated by employing conventionally prepared bread crumbs. The fluffy and pasty crumbs were incorporated into a barbeque sauce as detailed in Example I and compared to the bread crumbs of Example I.

| Finished Product | Example 1 Bread Crumbs | Ordinary Bread Crumbs Fluffy & Pasty |
|---|---|---|
| Texture | Pulpy | Not Pulpy |
| Mouthfeel | Not sticky | Sticky |
| Flavor | Clean | Floury and bready flavor |

EXAMPLE 3

An instant apple sauce is prepared from a dry mix having the following formulation:

| Ingredients | Parts by Weight |
|---|---|
| Pregelatinized Modified Tapioca Starch | 3.8 |
| Nonfat Dry Milk | 1.6 |
| High Fructose Corn Syrup | 26.3 |
| Bread Crumbs of Example 1 | 6.8 |
| Citric Acid | 0.2 |
| Sodium Citrate | 0.1 |
| Calcium phosphate | 0.1 |
| Apple Flavor | 0.02 |
| Color | 0.01 |

This dry mix is constituted into the final apple sauce product by simply adding about 39 grams of this mix to about 61 grams water at a temperature of about 65° C. and mixing until a thick apple sauce consistency results. The consistency (texture and pulpiness) of this apple sauce is similar to that of commercial apple sauces.

When the above apple sauce product was prepared with conventional bread crumbs the resulting sauce had a more gelatinous, undesirable texture.

EXAMPLE 4

A cooked simulated apple sauce is prepared by admixing the following ingredients:

| Ingredients | Parts by Weight |
|---|---|
| Modified Waxy Maize Starch | 1.6 |
| Nonfat Dry Milk | 1.9 |
| High Fructose Corn Syrup | 26.9 |
| Water | 62.7 |
| Bread Crumbs of Example 1 | 6.9 |
| Citric Acid | 0.2 |
| Sodium Citrate | 0.1 |
| Calcium citrate | 0.1 |
| Apple Flavor | 0.02 |
| Color | 0.01 |

These ingredients are cooked in a saucepan to a temperature of about 190° F. where they are held for about one minute. The consistency of the simulated apple sauce is again excellent and comparable to that of commercial apple sauces.

When the above apple sauce product was prepared with conventional bread crumbs, the resulting sauce had a gelatinous starchy and floury texture which was undesirable, resulting from the crumbs breaking down.

The above description is for the purpose of teaching those skilled in the art how to practice the present invention and is not intended to recite all the possible modifications and variations thereof which will become apparent to the skilled worker upon reading. It is intended, however, that all such modifications and variations be included within the scope of the invention which is defined by the following claims.

What is claimed is:

1. A process for preparing a sauce having a pulpy texture wherein the improvement comprises:
    (a) blending together sauce ingredients, wherein the sauce ingredients comprise bread crumbs, said bread crumbs consisting of from about 1 to about 10% of the sauce, based on the weight of the sauce, wherein said bread crumbs act as pulp-simulating particles, and said bread crumbs have a porous, elongated, and striated shape and structure, a particle size distribution such that the bread crumbs pass through a USS 16 mesh screen but are retained on a USS 60 mesh screen, and consist essentially of wheat flour, yeast and salt;
    (b) cooking said sauce in a heat exchanger, wherein said ingredients are held in the heat exchanger for a period of time effective to cook said sauce;

(c) cooling said cooked sauce; and
(d) bottling the sauce.

2. An improved process according to claim 1 wherein starch, a starch complexer, an acidulent, a saccharide sweetener, spices, flavors and colors are admixed with the aqueous liquid and the bread crumbs, and the resulting admixture is cooked with agitation under conditions effective to provide a continuous smooth sauce having discrete pulp-simulating particles dispersed uniformly throughout.

3. An improved process according to claim 2 wherein the food product is a barbeque sauce and comprises from 1 to 5% of the bread crumbs by weight of the sauce.

4. A process according to claim 2 wherein the bread crumbs have a particle size in which a maximum of 30% by weight of the crumbs are retained on a USS 30 mesh screen after passing a USS 16 mesh screen.

5. A process according to claims 2 or 1 wherein fruit flavor, an acidulent, a saccharide sweetener, starch and nonfat dry milk solids are admixed with the aqueous liquid and the bread crumbs to prepare a fruit flavored sauce having a continuous smooth phase with discrete pulp-simulating particles dispersed uniformly throughout.

6. A process according to claim 1 wherein the bread crumbs are prepared from dough ingredients comprising about 50 to about 65% wheat flour, about 30 to about 45% water, about 0.5 to about 1.5% yeast, about 0.25 to about 1.5% salt, 0 to about 2% fat, and 0 to about 2% sugar are blended into a smooth dough; and the dough is then covered, proofed, molded into units, covered and proofed again, and baked in a dielectric oven to form bread; and the bread is then cooled, permitted to stale for 18 to 30 hours, shredded, dried and screened to yield bread crumbs having the indicated particle size distribution.

7. A process according to claim 1 2 or 6 wherein a starch complexer is added in an amount effective to stabilize the bread crumbs in the aqueous medium.

8. A sauce product made by the process of claim 1.

* * * * *